March 30, 1965 P. G. IPSEN 3,176,094
FLUID PRESSURE ACTUATED CONTROL DEVICE FOR INDICATING
LOW SPEED OF A ROTATABLE MEMBER
Filed Oct. 27, 1960
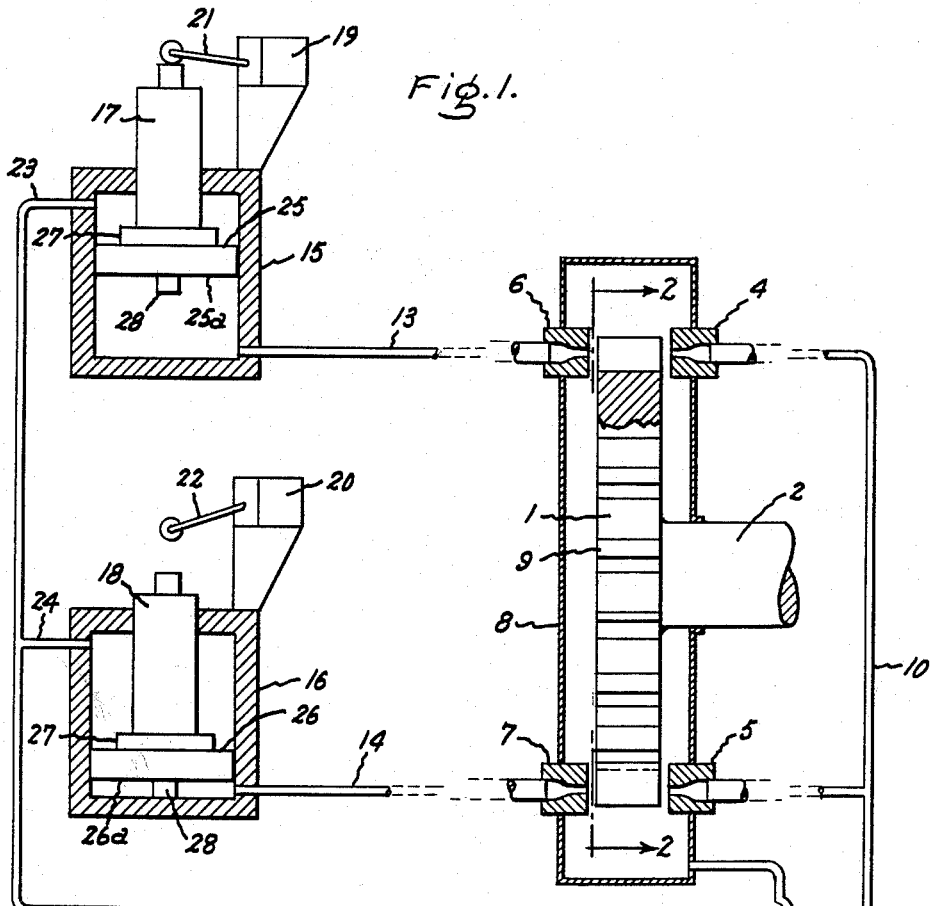
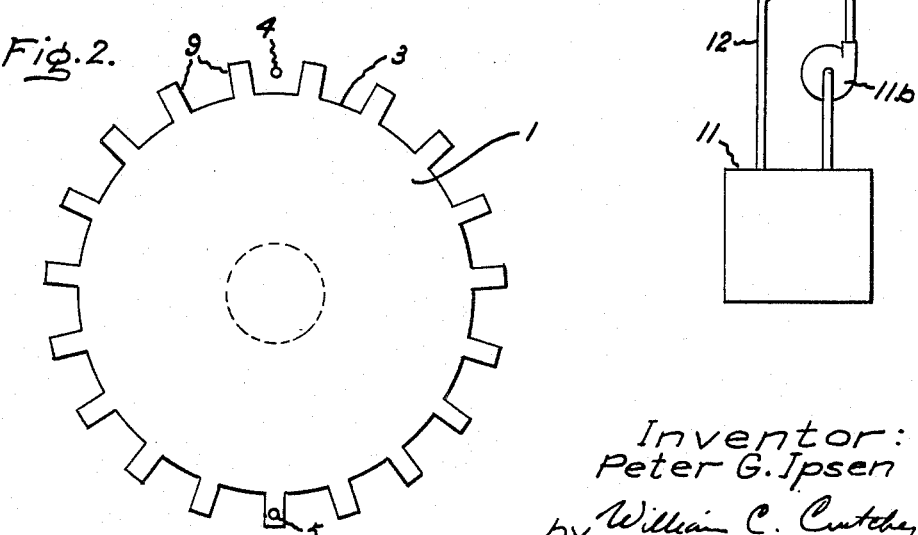
Inventor:
Peter G. Ipsen
by William C. Crutcher
His Attorney

United States Patent Office 3,176,094
Patented Mar. 30, 1965

3,176,094
FLUID PRESSURE ACTUATED CONTROL DEVICE FOR INDICATING LOW SPEED OF A ROTATABLE MEMBER
Peter G. Ipsen, Schenectady, N.Y., assignor to General Electric Company, a corporation of New York
Filed Oct. 27, 1960, Ser. No. 65,405
8 Claims. (Cl. 290—81)

This invention relates to a low speed indicating apparatus and, more particularly, to indicating apparatus that is responsive to speeds below a predetermined low speed, including standstill, of a rotatable member.

Frequently in the operation of rotatable apparatus, it is desirable to provide means for indicating when the apparatus stops rotating, or slows down below a predetermined minimum speed. For example, if a large steam turbine is allowed to come to rest following operation under load, its rotor will bow due to thermal gradients and may damage the packings, particularly if an attempt is made to restart the turbine with the rotor in this condition. A "turning gear" is provided to keep the shaft rotating at low speed so as to keep the shaft straight, and it is important that the device be put into service within a minute or so after the turbine comes to rest. An indicating means which provides a way for determining when the rotor has come to rest aids the operator in a manned plant in engaging the turning gear at the right time, and such a device is an essential component in an automated plant.

Speed responsive means such as centrifugal governors are designed to provide a suitable actuating force when the machine is operating at a "rated speed." However, such speed responsive means are wholly inadequate for discriminating between speeds far below this rated speed, since the actuating force developed by a centrifugal governor, for example, varies as the square root of the speed.

Therefore, in order to sharply discriminate between a very slow rotational speed and a still slower rotational speed, special provisions must be made to give a signal either when a predetermined very low speed is reached or when the rotatable member comes to a standstill. This provision for a low speed indicating apparatus has to be of a different type from the normal speed responsive means since the conditions under which it is designed to provide an indication or control function are entirely different. For example, it must discriminate between speeds where the member is turning very slowly, perhaps on the order of one r.p.m. On the other hand, it cannot be sluggish in operation but must give a definite signal when a desired predetermined low speed is reached.

Accordingly, one object of the present invention is to provide apparatus for indicating when a rotatable member has slowed down from a low speed to a still lower predetermined speed.

Another object is to provide apparatus for giving an indication of either a predetermined low speed of a rotatable member, or a standstill condition of the rotatable member, and irrespective of the position the rotatable member assumes when it stops.

Another object is to provide indicating apparatus which sharply discriminates between two rotational speeds of a slowly rotating member.

A further object is to provide a low speed indicating apparatus which can accommodate high rotational speed without damaging the indicating mechanism.

An additional object of the invention is to provide apparatus for indicating when a rotatable member has either stopped rotating or fails to rotate above a predetermined speed for a predetermined interval of time, while rendering such indicating apparatus inoperative if the machine does not remain stopped or does not continue to rotate below the predetermined speed for the full duration of such a given interval of time.

A still further object of the invention is to provide indicating apparatus for indicating when a rotatable body has been stopped for a predetermined interval of time, such indicating apparatus being relatively insensitive to vibration or mechanical shock thereby to insure accurate and consistent operation thereof.

Briefly stated, in accordance with one embodiment of the invention, a rotatable disk is provided having one or more apertures therein to afford one or more fluid passageways therethrough. A stream of fluid is directed against the surface of this disk by a nozzle and is directed to flow through the apertures to a receiver orifice when an aperture of the disk is aligned with the stream of fluid. The receiver orifice is coupled to a fluid container having a switch actuating piston mounted therein and operable when raised to actuate an indicating switch or other suitable control means. The rotatable disk is connected by any suitable means to a rotatable member, such as a steam turbine rotor. Thus, as long as the rotatable member is rotating above a predetermined speed, the disk is rotated sufficiently rapidly to interrupt the stream of fluid flowing from the nozzle and thus prevent sufficient fluid from passing through to the receiver orifice and thence to the switch container, thereby to prevent the piston in the container from being raised to actuate the indicating means or control means. However, when the rotatable member is slowed down below a predetermined relatively low speed or stopped completely, sufficient fluid is allowed to pass through the aperture or apertures in the disk to fill the fluid container after a predetermined time interval that may be determined by such factors as the number of apertures in the disk, the rate of rotation of the rotatable member, the volume of the piston container, and the piston travel of the switch to thus cause the piston to actuate the indicating or control means thereby to signal an operator and/or actuate appropriate control means to compensate for the reduction in speed of the rotatable member. Parallel systems insure proper operation no matter where the apertures happen to lie when the rotatable disk is at a standstill.

Other objects and advantages of the invention will become apparent from the description that follows when taken in connection with the accompanying drawings in which:

FIG. 1 is a schematic diagram of an indicating apparatus embodying the basic features of the invention.

FIG. 2 is a front elevation taken along the plane 1—1 of FIG. 1 showing a notched disk that may be utilized in the indicating apparatus illustrated in FIG. 1.

Referring to FIG. 1 of the drawing, a presently preferred embodiment of the invention will be described. A rotatable disk 1 is mounted on a shaft 2, which is coupled through any suitable means (not shown) to a rotatable member, such as a steam turbine rotor whose rotational status or condition is to be monitored. In order that the disk 1 may serve to actuate appropriate indicating apparatus, to be described in more detail later, the peripheral edge of the disk 1 is notched, as best seen in FIG. 2. The notches 3 in disk 1 are evenly spaced about the circumference of the disk and are all of the same circumferential width. Also, as the description proceeds, it will be manifest that the notches 3 could be replaced by apertures or other suitable means defining fluid flow passageways through the disk 1, and it will be understood that the illustrated notches are merely exemplary of one embodiment of the subject invention.

A first fluid flow directing nozzle 4 may be positioned at a point adjacent the upper peripheral edge of the disk 1 and a second fluid flow directing nozzle 5 may be positioned at a point adjacent the lower peripheral edge of the disk 1, and these nozzles are disposed to direct streams or jets of fluid toward oppositely positioned fluid receiving orifices 6 and 7, respectively. Each nozzle and its receiving orifice effectively act together as a conduit, when properly aligned and spaced from one another. The fluid from a jet issuing from such a nozzle is recovered in the receiving orifice with almost a complete recovery of fluid pressure. Both the nozzles 4, 5 and their respective receiving orifices 6 and 7, together with disk 1, are contained in an annular chamber 8.

It is important to note that the nozzles 4 and 5 and their associated fluid receiving orifices 6 and 7, respectively, are positioned relative to the notches 3 in disk 1 such that when the disk 1 is at rest, or in its standstill position, at least one of the nozzles and its respective fluid receiving orifice will be aligned with one of the notches 3 in the disk 1. Thus there is an unimpeded path for the fluid jet between at least one nozzle and its receiving orifice when the disk is stationary, no matter where it stops. This is illustrated by the unimpeded nozzle 4 and the blocked nozzle 5 in FIG. 2.

In the preferred embodiment of the invention which is illustrated, a suitable fluid under pressure, such as a low viscosity oil, is forced through the nozzles 4 and 5 after being supplied to the nozzles through a supply conduit 10 from a source of fluid shown as a reservoir 11 and a pump 11b. Although the nozzles 4 and 5 have been shown as being supplied from a common source of supply, these nozzles 4 and 5 may also be supplied from individual sources. In order to return the fluid to the reservoir 11, a drain conduit 12 is connected between a drain outlet in the base of the chamber 8 and the reservoir 11. This particular fluid draining arrangement is not a critical part of the invention and it will be understood that many variations therein will occur to those skilled in the art.

Receiving orifices 6, 7 are connected by means of conduits 13, 14 to suitable pressure responsive means shown here as a pair of fluid confining containers or cylinders 15 and 16 respectively. It will be seen that the containers 15 and 16 have pistons 17 and 18, respectively, freely positioned therein and disposed in close engagement with the side walls of these chambers. Other equivalent pressure responsive means such as bellows, etc., may also be suitable. The pistons 17 and 18 may be biased by any suitable means toward their lowermost positions against the fluid entering the respective containers 15 and 16 from conduits 13, 14. However, in the preferred embodiment of the invention, a differential in fluid pressures on either side of each of the pistons 17 and 18 is utilized to rapidly "reset" the pistons to their lowermost positions, as will be explained.

A pair of limit switches 19 and 20 are shown as having pivotal actuating arms 21 and 22 respectively disposed to be engaged by the uppermost ends of pistons 17 and 18, respectively, when these pistons are raised to their uppermost positions, thereby to transmit the movement of the pistons into a signalling or controlling function. For example, in applications for a turbine turning gear, switches 19, 20 could either actuate an alarm showing that the turning gear needed to be engaged, or they could actuate equipment (not shown) to automatically engage the turning gear. It will thus be seen that the pistons 17 and 18 serve to move the arms 21 and 22, respectively, to actuate switches 19 and 20 when these pistons 17 and 18 are moved to their uppermost positions. Normally the switches are connected in parallel in a circuit so that either one will perform the signalling or controlling function. Of course, if only a visual indication of the relative vertical position of the pistons 17 and 18 is desired, the surfaces of the pistons could be provided with suitable markings (not shown) to indicate relative displacement thereof, and the switches 19 and 20 could be omitted.

To provide the required bias to rapidly return the pistons 17 and 18 toward their lowermost positions, conduits 23 and 24 are connected, respectively, to ports above the pistons 17, 18 in containers 15 and 16 and are also connected to fluid supply line 10. It will be observed by reference to FIG. 1 that the upper surface areas 25 and 26, respectively, of the pistons 17 and 18, that are subjected to fluid pressure by fluid passing through conduits 23 and 24, respectively, are smaller than the respective lower surface areas 25a and 26a, respectively, that are subjected to the pressure of fluid from the conduits 13 and 14, respectively. Therefore, when the chambers above and below portions 17, 18 are exposed to substantially the same fluid pressures, the pistons will be raised to their uppermost positions, due to the differential piston areas. Also, it will be noted that pistons 17 and 18 are provided with stops 27 and 28 on their upper and lower surfaces, respectively, to prevent the pistons from blocking the entrances of conduits 13, 14 and 23, 24, into the chambers 15 and 16 respectively. The parameters such as conduit size, piston area, etc., are chosen so that downward travel of pistons 17, 18 takes place at a more rapid rate than upward travel.

It will be appreciated that while the switches 19 and 20 are shown in a general manner as being actuated by the operation of pistons 17 and 18, any suitable circuit control means or signal indicating means might be substituted for or used in conjunction with the switches 19 and 20 to perform a variety of indicating and control functions.

Prior to considering the operation of the invention in detail, it should be understood that nozzles 4 and 5 are positioned with respect to the notches 3 in disk 1 such that at least one of the nozzles (4 or 5) will be aligned with one of the notches 3 in the disk 1 regardless of what position the disk 1 assumes when it comes to rest. When the path between one nozzle, such as 4, and its receiving orifice 6 is unimpeded, the fluid jet will be recaptured by the orifice, with almost full pressure recovery. Since the recovered pressure in conduit 13 is almost the same as the supply pressure in conduit 23, the piston 17 will move upward because of the differential piston area and fluid will flow into cylinder 15 from conduit 13. The length of time this flow takes place naturally depends on the length of time the path between nozzle 4 and orifice 6 is unblocked. If the time interval is long enough, such as when the disk is stopped or is moving very slowly, the piston 17 will travel all the way to the top of cylinder 15 and actuate switch 19.

The foregoing description applies also to the parallel system including nozzle 5, orifice 7, conduit 14, cylinder 16, piston 18, switch 20, and conduit 24. This system operates in the same manner and independently of the first system so as to provide for the case where a nozzle is blocked at standstill.

The operation of the indicating apparatus of the invention will be discussed in conjunction with its application to indicate the rotational status of a steam turbine. In such an application, the disk 1 is coupled through shaft 2 and any other suitable coupling means (not shown) to a rotatable member of a steam turbine. Thus, while the turbine rotor turns, the disk 1 is also rotated and the teeth 9, which block the fluid flowing through conduit 10, are moved past the nozzles 4 and 5 at a sufficiently rapid rate to substantially completely interrupt the streams of fluid flowing from the nozzles 4 and 5 toward the receiving orifices 6 and 7, respectively.

Assume, for example, that the turbine is slowing down, so that teeth 9 are moving rapidly between nozzles 4, 5 and receiving orifices 6, 7 so as to knock the fluid jets aside. No fluid is recovered by orifices 6, 7, since the fluid merely falls to the bottom of chamber 8.

As the disk slows, there is enough time, due to notches 3 allowing a part of the jet to pass through, for a portion of the fluid to be recovered in orifices 6, 7. Therefore, since the pressures in conduits 13, 14 are substantially the same as pressures in conduits 23, 24, the pistons 17, 18 will start to rise in the cylinders due to the differential areas on the pistons. Immediately, however, the next tooth 9 passing knocks the remainder of the jet aside, and when the jet is thus blocked momentarily, the pressure collapses in conduits 13, 14 and the pistons 17, 18 "reset" themselves due to the pressure above the pistons.

As the disk slows still further, more and more fluid is recovered by the orifices 6, 7 before the teeth 9 knock the jets aside and the pistons 17, 18 consequently rise higher in the cylinders. Each time, however, the pistons reset to their initial positions and since the parameters are chosen so that the pistons always reset faster during the time that the jet is blocked than they move upward during the time the jet is unobstructed, the pistons will not "inch" upward giving a false indication.

At a predetermined slow speed, the pistons will move upward far enough to actuate switches 19, 20. Thus the arrangement shown sharply discriminates between a slow speed and a still slower predetermined speed.

It will be seen that when the disk 1 comes to a complete stop, one of the streams of fluid flowing from one of the nozzles (4 or 5) will be always uninterrupted or unblocked by one of the teeth 9 on the disk 1, as shown for example by the positioning of disk 1 in FIGS. 1 and 2. When the disk 1 assumes such a stopped position, fluid flows through the orifice 6 and its associated conduit 13 to container 15 and, thus, serves to raise the piston 17 after a predetermined time interval sufficient to fill the container 15 and raise the piston 17 to pivot switch-actuating arm 21 so as to actuate switch 19. The switch 19 may either be coupled to signal means or to automatic control means for engaging the turning gear of the turbine, for example, and switch 20 will be connected in parallel with switch 19, so regardless of which of these switches 19 or 20 is closed, the desired signal indicating operation or control function will be caused to occur.

It will be understood that the foregoing description is directed toward an exemplary embodiment of the invention, and it will be appreciated that in certain applications having light weight rotating members it might be desirable to provide means, such as a detent mechanism (not shown) to insure that the disk 1 will always stop in a given position with the path between nozzle and receiving orifice unimpeded. In such an embodiment, it would not be necessary to provide parallel systems, each system including a switch actuating arrangement, a piston and its associated container, a nozzle and a fluid receiving orifice and conduit to conduct fluid to such a container. Thus, in such a modified arrangement of the invention a desirable indicating or control function could be performed by a single container, such as the container shown at 15 and its associated fluid control conduits 13 and 23, and control switch 19, respectively.

By means of using pistons with differential piston areas, where the supply pressure is balanced against a pressure in a fluid recovered from a nozzle also at supply pressure, the arrangement shown is able to give satisfactory results over a wider range of supply pressure, than would be possible if a return biasing means not responsive to supply pressure were used. For instance, as the pressure in conduits 23, 24 goes up due to a fluctuation in operation of pump 11b, the pressures in conduits 13, 14 also go up since they are derived from the same pump.

It may also be noted that when disk 1 is turning very rapidly, the oil jets are merely rapidly pushed aside and do not get through to the receiver nozzles at all. Thus there will be no motion of the pistons or vibrations in the receiver conduits 13, 14 which could damage the indicator mechanism.

In order to utilize the invention to provide a direct indication of the rotational velocity of a given member, it will be apparent that the various flow regulating parameters of the invention, such as the number of nozzles and receiving orifices, the size of the conduits, the relative areas of the upper and lower piston surfaces, and the fluid pressure in the high pressure fluid conduits may be changed as desired. For example, assuming that an operator of the preferred embodiment of the invention shown in FIG. 1 wished to utilize the invention to directly indicate the rotational velocity of the shaft 2, he would stabilize the pressure supplied to the conduit 10 by appropriately regulating pump 11, then he would note the relative upward positions reached by pistons 17 and 18 for given speeds of the shaft 2. After suitably marking the pistons 17 and 18 to indicate such relative positions, it is readily apparent that in subsequent runs of the shaft 2, the pistons 17 and 18 will be moved to expose the markings thereon corresponding to the given speeds, as such speeds are attained.

While particular embodiments of the invention have been shown and described, it will be obvious to those skilled in the art that various modifications may be made therein without departing from the invention in its broader aspects. Therefore, it is intended in the following claims to encompass all such modifications as fall within the true scope of the invention.

What I claim as new and desire to secure by Letters Patent of the United States is:

1. A low speed indicating apparatus comprising at least one fluid nozzle, a source of fluid under pressure connected to said nozzle and causing a jet of fluid to flow therefrom, a conduit member defining a fluid receiving orifice spaced from said nozzle and aligned to recover a substantial amount of the fluid from said jet, pressure responsive means connected to said conduit member and receiving fluid from said fluid receiving orifice, switching means arranged to be activated by said pressure responsive means after the jet has flowed into the fluid receiving orifice for a predetermined length of time, means resetting said pressure responsive means to its initial position when the fluid jet is blocked from flowing into the fluid receiving orifice, and a movable member disposed between the orifice and the nozzle and defining spaced apertures, whereby said fluid jet is intermittently unimpeded for periods of time determined by the speed of said movable member.

2. A low speed indicating apparatus comprising at least one fluid nozzle, a source of fluid under pressure connected to said nozzle and causing a jet of fluid to flow therefrom, a conduit member defining a fluid receiving orifice spaced from said nozzle and aligned to recover a substantial amount of the fluid from said jet, pressure responsive means connected to said conduit member and receiving fluid from said fluid receiving orifice, switching means arranged to be activated by said pressure responsive means after the jet has flowed into the fluid receiving orifice for a predetermined length of time, means resetting said pressure responsive means to its initial position when the fluid jet is blocked from flowing into the fluid receiving orifice, a rotatable member disposed between the nozzle and the orifice and defining evenly circumferentially spaced apertures whereby said jet is intermittently unimpeded for periods of time determined by the speed of rotation of said rotatable member.

3. A low speed indicating apparatus comprising at least one fluid nozzle, a source of fluid under pressure connected to said nozzle and causing a jet of fluid to flow therefrom, a conduit member defining a fluid receiving orifice spaced from said nozzle and aligned to recover a substantial amount of the fluid from said jet, pressure responsive means connected to said conduit member and receiving fluid from said fluid receiving orifice, said pressure responsive means including a cylinder having a piston therein which is movable in response to the fluid pressure in said conduit member, switching means arranged to be actuated by said piston after the jet has flowed into the fluid receiving orifice for a predetermined length of time, means resetting said piston to its initial position when the fluid jet is blocked from flowing into the fluid receiving orifice, and a rotatable member disposed between the nozzle and the orifice and defining evenly circumferentially spaced apertures whereby said jet is intermittently unimpeded for periods of time determined by the speed of rotation of said rotatable member.

4. A low speed indicating apparatus comprising first and second fluid nozzles, a source of fluid under pressure connected to said nozzles and causing jets of fluid to flow therefrom, first and second conduit members defining fluid receiving orifices spaced from said nozzles and aligned to recover a substantial amount of the fluid from said jets, first and second pressure responsive means connected to said first and second conduit members respectively and receiving fluid from said fluid receiving orifices, switching means arranged to be actuated by either of said pressure responsive means after the jets have flowed into the fluid receiving orifices for a predetermined length of time, means resetting said pressure responsive means to their initial positions when the fluid jets are blocked from flowing into the fluid receiving orifices, and a rotatable member disposed between the nozzles and the orifices and defining evenly circumferentially spaced apertures whereby said jets are intermittently unimpeded for periods of time determined by the speed of rotation of said rotatable member, said nozzles being arranged with respect to said apertures so that at least one nozzle is always aligned with one of the apertures.

5. A low speed indicating apparatus comprising first and second fluid nozzles, a source of fluid under pressure connected to said nozzles and causing jets of fluid to flow therefrom, first and second conduit members defining fluid receiving orifices spaced from said nozzles and aligned to recover a substantial amount of the fluid from said jets, first and second pressure responsive means connected to said first and second conduit members respectively and receiving fluid from said fluid receiving orifices, each of said pressure responsive means including a cylinder having a piston therein which is movable in response to the fluid pressure in the respective conduit member, switching means arranged to be actuated by said pistons after the jets have flowed into the fluid receiving orifices for a predetermined length of time, means resetting said pistons to their initial positions when the fluid jets are blocked from flowing into the fluid receiving orifices, and a rotatable member disposed between the nozzles and the orifices and defining evenly circumferentially spaced apertures whereby said jets are intermittently unimpeded for periods of time determined by the speed of rotation of said rotatable member, said nozzles being arranged with respect to said apertures so that at least one nozzle is always aligned with one of the apertures.

6. A low speed indicating apparatus comprising first and second fluid nozzles, a source of fluid under pressure connected to said nozzles and causing jets of fluid to flow therefrom, first and second conduit members defining orifices spaced from said nozzles and aligned to recover a substantial amount of the fluid from said jets, first and second pressure responsive means each including a chamber having a piston therein defining oppositely facing surfaces of different effective areas, said first and second conduit members being connected to admit fluid from said fluid receiving orifices to the piston sides having the larger areas, third and fourth conduit members connected between said fluid pressure source and the sides of the pistons having smaller areas. whereby substantially equal pressures on either side of the pistons in either of the first or second pressure responsive means will cause the pistons to move in a first direction, while reduced pressures in the first and second conduit members will cause the pistons to return to their initial positions, switching means arranged to be actuated by said pistons after they have moved a predetermined distance in said first direction, and a rotatable member disposed between the orifices and the nozzles and defining evenly circumferentially spaced apertures, whereby said jets are intermittently unimpeded for a length of time determined by the speed of rotation of said rotatable member, said nozzles being arranged with respect to said apertures so that at least one nozzle is always aligned with one of said apertures.

7. Indicating apparatus comprising a nozzle for directing stream of fluid, means supplying fluid to said nozzle under pressure thereby causing a stream of fluid to flow from said nozzle, means defining an orifice for receiving said stream of fluid, means supporting said nozzle in spaced relation to said orifice whereby said stream of fluid is directed by said nozzle through said orifice, a disk rotatably mounted between the nozzle and the orifice for interrupting the stream of fluid when said disk is rotated, means for rotating said disk, means defining a plurality of spaced apertures through said disk to afford passageways for said stream of fluid between the nozzle and the orifice, means responsive to a condition to be indicated for reducing the speed of rotation of said disk thereby to allow more fluid to flow through said apertures to said orifice, a cylinder for receiving fluid passed through said orifice, means defining first and second fluid inlets to said cylinder at spaced points thereon, conduit means connecting said orifice and said first inlet to said cylinder whereby fluid passed through said orifice is caused to flow into said cylinder, a differential piston slidably disposed within said cylinder between said inlets, said piston being free to move between said inlets in response to a differential in pressure on the two fluid engaging surfaces thereof caused by the interruption of the stream of fluid flowing from said nozzle toward said orifice, conduit means connecting said second inlet to said means supplying fluid under pressure to the nozzle whereby fluid is caused to flow into said cylinder and engage one surface of said piston thereby to move said piston toward the first inlet when the flow of fluid through said first inlet is reduced below a predetermined volume by rotation of said disk, a switch, and means coupling said switch to the piston whereby said switch is actuated when the piston moves a predetermined distance toward said second inlet in response to the disk being rotated below a predetermined speed to allow more fluid to flow through said apertures to said orifice.

8. Indicating apparatus comprising a first and a second nozzle for directing two streams of fluid therefrom, means supplying fluid to said nozzles under pressure thereby causing streams of fluid to flow continuously from said nozzles, means defining a first and a second orifice for receiving said streams of fluid respectively from said first and second nozzles, means supporting said nozzles in spaced relation to said orifices whereby said streams of fluid are directed from each nozzle to its respective orifice, a first and a second container for receiving fluid passed through the first and second orifice respectively, conduit means connecting said nozzles to their respective containers whereby fluid passed through said orifices is caused to flow into said containers, a first and a second piston disposed respectively in said first and second containers, said pistons being free to rise and fall within their respective containers in response to variations in the fluid level therein, a first and second switch, means coupling said switches to said first and second pistons respectively whereby said switches are actuated when their respective piston rises to a predetermined level within its container, a disk rotatably mounted between said nozzles and orifices for interrupting the streams of fluid therebetween when rotated, means for rotating said disk, means defining a plurality of spaced apertures through said disk to afford passageways for said streams of fluid between the nozzles and their respective orifices, said apertures being spaced apart such that at least one aperture will be aligned with one of said streams when said disk is stopped to allow fluid to flow to one of said containers when said disk is stopped, whereby fluid flows from one of said nozzles through an aperture in the disk and one of said orifices to its respective container to actuate the switch connected to the piston in said container after a predetermined time lapse sufficient to allow the piston to be raised to its switch actuating position.

References Cited by the Examiner

UNITED STATES PATENTS

| | | | |
|---|---|---|---|
| 2,333,044 | 10/43 | Rosch | 73—521 |
| 2,658,482 | 11/53 | Harris | 137—47 |
| 2,719,035 | 9/55 | Morris et al. | 137—36 |
| 2,730,589 | 1/56 | Perry et al. | 200—82 |
| 2,862,076 | 11/58 | Bonner | 200—81 |
| 2,966,565 | 12/60 | Ryan | 200—81 |
| 2,982,902 | 5/61 | Le Gates et al. | 73—523 |

FOREIGN PATENTS

| | | |
|---|---|---|
| 179,356 | 11/06 | Germany. |
| 500,864 | 6/30 | Germany. |
| 1,004,048 | 3/57 | Germany. |

ROBERT K. SCHAEFER, *Acting Primary Examiner.*

RICHARD M. WOOD, BERNARD A. GILHEANY, *Examiners.*